United States Patent Office 2,957,022
Patented Oct. 18, 1960

2,957,022

ESTERS OF CYCLOPENTANE-1,3-DICARBOXYLIC ACID

Charles A. Cohen, Roselle Park, N.J., assignor to Esso Research and Engineering Company, a corporation of Delaware No Drawing. Filed Apr. 30, 1957, Ser. No. 655,946

7 Claims. (Cl. 260—468)

This invention relates to new types of esters. Particularly, the invention relates to synthetic esters formed from cyclic dicarboxylic acids having 5 carbon atoms in the ring, which esters are useful as lubricating oils.

Various diesters and complex esters have been used as lubricating oils and their preparation and characteristics have been described in numerous patents, such as Patent Nos. 2,723,286; 2,743,234; 2,575,195 and 2,575,196. However, it has been generally understood, that in order to obtain synthetic diesters and complex esters having high viscosity indexes and the desired viscosity and pour point suitable for use as lubricating oils, it was necessary to use straight chain dicarboxylic acids in preparing the esters. Such esters as, for example, the 2-ethyl hexyl esters of sebacic, azelaic and adipic acids have been long used for lubricating purposes. On the other hand, diesters formed from cyclic dicarboxylic acids having 4 or 6 carbon atoms in the ring have shown poor viscosity indexes, making them unsuitable for use as lubricants. Examples of such latter materials are the 2-ethyl hexyl esters of ortho-phthalic, meta-phthalic, and tere-phthalic acids (each of which have 6 carbon atoms in the ring), which esters have viscosity indexes respectively of 13.2, 33.5 and 25.9. Saturation of the ring to either tetrahydro or hexahydro phthalates results in a material having even poorer viscosity characteristics. In a like manner, the bis-2, ethyl hexyl ester of pinic acid (which has 4 carbon atoms in the ring) has a viscosity index of 86. However, it has now been found that diesters and complex esters having low pour points, high viscosity indexes, and other properties suitable for lubricating oils can be prepared from certain cyclic dicarboxylic acids having 5 carbon atoms in the ring, which acids are readily prepared from inexpensive and plentiful raw materials.

The synthetic esters of this invention include fully esterified diesters of the cyclic dicarboxylic acid and alkanols; and complex esters such as those formed from half esters of the cyclic dicarboxylic acid and glycols or polyglycols, said half esters being completely esterified with a member selected from the group consisting of alkanoic acids and alkanols.

These synthetic esters therefore consist of (a) unsubstituted or methyl substituted, saturated hydrocarbon chains and (b) ether interrupted, unsubstituted or methyl substituted, saturated hydrocarbon chains, said chains being linked by ester linkages to the cyclic dicarboxylic acid, i.e. alkane and/or oxa-alkane groups linked by ester linkages to the dicarboxylic acid. The number of carbon atoms in the above types of esters will generally be about 19 to 150 carbon atoms, e.g. 19 to 60 carbon atoms.

Preferred esters are those diesters and complex esters, and mixtures thereof, having the formula:

$$R'—X—[R_1—X]_n—R_2$$

wherein $R'$ and $R_2$ represent straight chain or branched chain alkyl radicals of an alkanol containing 6 to 15 carbon atoms, $R_1$ contains 2 to 18, e.g. 2 to 10 carbon atoms, and is the alkylene radical of a glycol or an oxyalkylene radical of a polyglycol, X is the radical of the cyclic acid of the invention, and $n$ is a number of from 0 to 6. In the case of the diester, i.e. $n=0$, the total number of carbon atoms will be about 19 to 37. In the case of the complex ester, i.e. $n=1$ to 6, the total number of carbon atoms will be about 28 to 150, e.g. 28 to 60, carbon atoms.

The cyclic dicarboxylic acid used in this invention is either norcamphoric acid or an alkyl substituted norcamphoric acid. These acids have the following general formula:

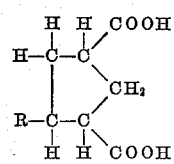

wherein R may be either hydrogen or an alkyl group of about 1 to 4, preferably 1 to 2, carbon atoms. When R is hydrogen, the compound is norcamphoric acid (1,3-dicarboxy cyclopentane), and when R is an alkyl group such as methyl, the compound is 1,3-dicarboxy, 4-methyl cyclopentane.

Norcamphoric acid may be conveniently prepared by oxidation of bi-cyclo (2,2,1) heptene-2 which, in turn, is made by a Diels-Alder condensation of cyclopentadiene and ethylene. The resulting bi-cyclo heptene, commonly known as norbornylene, is a white crystalline material boiling at 96.1° C. and melting at 46° C. Oxidation of the norbornylene yields norcamphoric acid melting at 120° to 121° C. In similar manner, 5-methyl bi-cyclo (2,2,1) heptene-2 may be prepared by the condensation of cyclopentadiene and propylene. It boils at 115.9–116.3° C. Oxidation of the 5-methyl bi-cyclo heptene yields 4-methyl cyclopentane 1,3-dicarboxylic acid. Raw materials for the preparation of methyl-substituted norcamphoric acids may also be obtained from the Diels-Alder condensation of methyl cyclopentadiene and ethylene. Since commercial methyl cyclopentadiene (in the form of its dimer) consists of a mixture of approximately 35% of 1-methyl cyclopentadiene and 65% of 2-methyl cyclopentadiene, the methyl norbornylenes which are obtained, by addition of ethylene, comprise a mixture of the two in the same proportion.

The 4-ethyl cyclopentane 1,3-dicarboxylic acid may be prepared by oxidation of 5-ethyl bi-cyclo (2,2,1) heptene-2. This latter compound has been prepared by the condensation of butene-1 with cyclopentadiene and has the following properties: B.P. 760 mm. Hg of 143.2–143.5° C.; $n$ 20° C./D of 1.4611–1.4615; D 20/4 of 0.8668.

Examples of alcohols used in forming the esters include n-hexyl alcohol, 2-ethyl hexyl alcohol, decyl alcohol, isodecyl alcohol, tridecyl alcohol, etc.

Primary, highly branched chain aliphatic alcohols made by the Oxo process are particularly desirable for use in the present invention because of their high degree of branching. For example, the $C_8$ Oxo alcohols consist primarily of di-methyl substituted hexanols. In the Oxo synthesis process, olefins, such as polymers and copolymers of $C_3$ and $C_4$ monoolefins, are reacted with carbon monoxide and hydrogen in the presence of a cobalt catalyst at temperatures of about 300° to 400° F. and pressures of about 1000 to 4000 p.s.i. to form an aldehyde having one carbon atom more than the olefin originally used. The aldehyde is catalytically hydrogenated to the corresponding alcohol which is recovered as an overhead product by distillation of the reaction mixture.

Glycols which may be used include ethyleneglycol, and any of the paraffinic homologues of the same containing up to 18 carbon atoms. Examples of such glycols include: ethylene glycol, propylene glycol, butylene glycol, trimethylene glycol, tetramethylene glycol, etc. Polyglycols may also be used such as polyethylene glycols of the formula $$HO(CH_2CH_2O)_nCH_2CH_2OH$$

wherein $n$ is 1 to 8, and polypropylene glycols of the formula $$HO(\overset{R_1}{\underset{|}{C}}H-\overset{R_2}{\underset{|}{C}}HO)_n\overset{R_1}{\underset{|}{C}}H-\overset{R_2}{\underset{|}{C}}HOH$$

wherein either $R_1$ or $R_2$ is a methyl group and the other is hydrogen, and $n$ is 1 to 4.

The esters of the invention may be prepared by mixing the desired quantities of acid, glycol and/or alcohol, and heating in the presence of an esterification catalyst such as sodium bisulfate, sulfuric acid, calcium oxide, sodium methylate, etc., and a water-entraining agent such as toluene, heptane, etc. Ester interchange reactions and conventional esterification methods may also be used.

The invention will be more clearly understood by reference to the following examples:

EXAMPLE I—BIS-2 ETHYL HEXYL NORCAMPHORATE

To a reaction flask fitted with a stirrer, thermometer, water trap and reflux condenser, there were added in order: 110 grams of norcamphoric acid, 260 grams of 2-ethyl hexyl alcohol, 200 ml. of toluene and 0.5 gram of para-toluene sulfonic acid. The mixture was heated with stirring under reflux until a total of 26 ml. water were recovered. The reaction mixture was cooled, diluted with ether, washed free of acid with water and, after drying, the ether and toluene were removed under moderate vacuum. The product was finally distilled under high vacuum, boiling between 168° C. at 0.3 mm. Hg to 171° C. at 0.35 mm. Hg. There was recovered a total of 265 grams of product.

EXAMPLE II

A diester of isooctyl alcohol (a $C_8$ Oxo alcohol prepared by subjecting a butylene-propylene copolymer having 7 carbon atoms to the Oxo process) and norcamphoric acid was prepared in the manner described in Example I. Starting with 158 grams of norcamphoric acid, there were obtained 352 grams of product boiling at 148–149° C. at 0.16 mm. Hg.

EXAMPLE III

A diester of isodecyl alcohol (a $C_{10}$ Oxo alcohol prepared by subjecting tripropylene to the Oxo process) and norcamphoric acid was prepared by an ester interchange reaction between 2-ethyl hexyl norcamphorate and Oxo decyl alcohol. To a reaction flask, there was added 200 grams of bis, 2-ethyl hexyl norcamphorate, 430 grams of Oxo decyl alcohol and 1 gram of sodium methylate. The flask was connected to a 15-plate Oldershaw fractionating column and distilled at a 15/1 reflux ratio. There was obtained overhead between the temperature limits of 183° C. to 205° C., 184 ml. of alcohol at corresponding reaction temperatures of 215° to 231° C. The crude product was cooled, filtered and distilled under high vacuum. There was obtained pure di-Oxo decyl norcamphorate boiling at 201° C. at 0.8 mm. Hg which weighed 182 grams. The product had an acid number of 0.1 mg. KOH per gram and a saponification number of 255 mg. KOH per gram.

EXAMPLE IV

In a similar manner to Example I, there was prepared di-n-nonyl norcamphorate boiling at 180°–182° C. at 0.3 mm. Hg.

EXAMPLE V

In similar manner to Example I, there was prepared di-n-decyl norcamphorate boiling at 206° C. at 0.15 mm. Hg.

EXAMPLE VI

A complex ester of the type alcohol-dicarboxylic acid-(glycol-dicarboxylic acid)$_n$-alcohol, wherein $n$ is 1, was prepared by the ester interchange of di-ethyl norcamphorate, polyethylene glycol (200 mol. wt.) and Oxo decyl alcohol. Di-ethyl norcamphorate was prepared in a conventional manner and boiled at 153°–155° C. at 25 mm. Hg.

To a reaction flask, there were added 99 grams of polyethylene glycol-200 (0.5 mol), 214.3 grams of di-ethyl norcamphorate (1.0 mol), 168.3 grams of Oxo decyl alcohol (1.0 mol), 150 ml. of toluene and 0.2 gram of sodium methylate. The reaction mixture was heated with stirring under a 15-plate Oldershaw fractionating column using a 15/1 reflux ratio. There was taken overhead an ethyl alcohol-toluene azeotrope boiling between 75°–78° C. The residue, on cooling was diluted with water, water-washed, dried and the low-boiling materials removed by stripping at a reaction pot temperature of 200° C. at a pressure of 1 mm. Hg.

Complex esters such as those described above may also be prepared by a one-step method involving ester interchange of higher diesters of norcamphoric acid and polyglycols as shown by the following equation:

$$R_1-X-R_1+H(OC_2H_4)_nOH+R_1-X-R_1 \rightarrow$$
$$R_1-X-(OC_2H_4)_nO-X-R_1+2R_1OH$$

wherein $R_1$ is a $C_6$ to $C_{13}$ alkyl radical and X is the acid of the invention.

The physical inspections of the products prepared in the above examples are shown in Table 1. For comparison purposes, the properties of several esters of other types of dicarboxylic acids are also shown.

As seen from the table, the simple esters of norcamphoric acid have properties which make them outstanding as lubricating oils. For example, the 2-ethyl hexyl ester of norcamphoric acid has a pour point of −90° F. as compared to a pour point of <−65° F. for the 2-ethyl hexyl diesters of pimelic acid, which is a straight-chain acid of comparable carbon atom content. At the same time, the viscosity index of the diesters of norcamphoric acid was comparable to that of diesters of straight-chain acids. However, the very low pour point and high V.I. of the norcamphoric acid ester is surprising and unexpected as esters of other cyclic dibasic acids had poor lubricating characteristics. For example, the 2-ethyl hexyl pinate, while having a pour point of −65° F., had a viscosity index of only 86. Furthermore, while esters of straight-chain dicarboxylic acids have been commercially used, these straight-chain acids are in relatively short supply and expensive, however, the acids of the invention may be readily prepared from raw materials such as cyclopentadiene and ethylene, which are inexpensive and readily available in large quantities.

The esters of the invention are particularly suitable for aviation and high compression engines. The esters of the invention which may be used for such lubrication are those having an A.S.T.M. pour point below about 0° F., a viscosity at 210° F. of about 2 to 30 centistokes and a viscosity index of above 100.

Additive materials may be added to the synthetic ester lubricating oils of this invention to further improve various properties of said esters. For example, the ester oil may contain 0.01 to 10.0% of such additives as: oxidation inhibitors such as phentothiazine and phenyl-alpha-naphthylamine; rust inhibitors such as sorbitan monooleate and triethanolamine monooleate; detergents such as calcium sulfonates; load-carrying agents such as tricresyl phosphate; pour point depressants; viscosity index improvers; etc. For example, .05 to 2.0 wt. percent of phenothiazine may be added to the esters of the invention as an oxidation inhibitor. More specifically, 0.5 wt. percent, based on the weight of the ester, of phenothiazine may be added to the diisooctyl norcamphorate

Table 1
ESTERS OF DICARBOXYLIC ACIDS

| Ex. No. | | Pinematic Viscosity, Cs. | | | | V.I. | Pour Point, °F. |
|---|---|---|---|---|---|---|---|
| | | 210° F. | 100° F. | −40° F. | −65° F. | | |
| | Di-2-ethylhexyl adipate | 2.38 | 8.22 | 870 | 5,000 | 121 | −75 |
| | Di-2-ethylhexyl azelate | 3.06 | 11.4 | 1,190 | 6,900 | 146 | <−75 |
| | Di-2-ethylhexyl sebacate | 3.32 | 12.6 | 1,410 | 8,300 | 154 | −67 |
| | Di-2-ethylhexyl pinate [1] | 3.67 | 18.50 | 10,650 | 100M | 86 | −65 |
| | Di-2-ethylhexyl pimelate | 2.65 | 9.28 | 878 | 4,970 | 137 | <−65 |
| I | Di-2-ethylhexyl norcamphorate | 2.69 | 9.63 | 1,209 | 8,173 | 133 | −90 |
| II | Di-isooctyl norcamphorate | 3.05 | 11.28 | | | 146.5 | |
| III | Di-isodecyl norcamphorate | 4.005 | 16.98 | 3,866 | 34M | 158 | <−90 |
| IV | Di-n-nonyl norcamphorate | 3.24 | 11.49 | | | 170 | −25 |
| V | Di-n-decyl norcamphorate | 3.71 | 13.84 | | | 179 | −40 |
| VI | Complex ester [2] of norcamphoric acid | 8.14 | 44.10 | 1,980 | | 146 | −60 |

[1] Pinic acid has the formula:

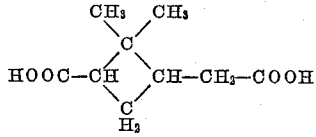

[2] Comple ester had the formula: decyl alcohol—norcamphoric acid—(polyethylene glycol—norcamphoric acid)$_n$—decyl alcohol, wherein $n=1$.

of Example II. Also, the esters of the invention may be blended with other synthetic lubricants or mineral lubricating oil to form lubricating compositions having certain desired properties. These esters may also be used in greases or as plasticizers for synthetic resins.

What is claimed is:

1. An ester having the general formula:

$$R'—X—[R_1—X]_n—R_2$$

wherein R' and $R_2$ are alkyl radicals containing 6 to 15 carbon atoms, $R_1$ contains 2 to 18 carbon atoms and is selected from the group consisting of alkylene and oxyalkylene radicals, $n$ is from 0 to 6, and X is a divalent dicarboxylic acid radical having the formula:

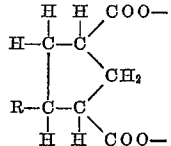

wherein R is selected from the group consisting of hydrogen and alkyl radicals of 1 to 4 carbon atoms, and wherein said ester contains a total of 19 to 150 carbon atoms.

2. An ester according to claim 1, wherein said dicarboxylic acid is 1,3-dicarboxy cyclopentane.

3. An ester according to claim 1, wherein said dicarboxylic acid is 1,3-dicarboxy, 4-methyl cyclopentane.

4. A complex ester according to claim 1 wherein $n=1$ to 6.

5. A diester according to claim 1 wherein $n=0$.

6. A diester having the formula:

$$R'—X—R_2$$

wherein R' and $R_2$ are each alkyl radicals of alcohols containing about 6 to 15 carbon atoms per molecule, and X is a divalent radical of 1,3-dicarboxy cyclopentane having the following formula:

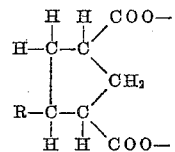

7. A diester according to claim 6 wherein the alcohols are highly branched-chain primary alcohols.

References Cited in the file of this patent
UNITED STATES PATENTS

| | | |
|---|---|---|
| 1,993,737 | Graves et al. | Mar. 12, 1935 |
| 2,015,088 | Reid | Sept. 24, 1935 |
| 2,481,372 | Von Fuchs | Sept. 6, 1949 |
| 2,482,517 | Schiermeier | Sept. 20, 1949 |
| 2,499,983 | Beavers | Mar. 7, 1950 |
| 2,559,521 | Smith et al. | July 3, 1951 |
| 2,679,509 | Hasselstrom | May 26, 1954 |
| 2,729,665 | Buckmann | Jan. 3, 1956 |
| 2,765,334 | Stinson et al. | Oct. 2, 1956 |
| 2,840,593 | Sommers et al. | June 24, 1958 |